US006823955B2

(12) United States Patent
Hall et al.

(10) Patent No.: US 6,823,955 B2
(45) Date of Patent: Nov. 30, 2004

(54) 360 DEGREE AIR INTAKE SCREEN

(75) Inventors: Stanley Kermit Hall, Godwin, NC (US); Neil Vincent Harber, Benson, NC (US); Robert Alan Henson, Willow Springs, NC (US); Jennifer Lynn Jaramillo, Raleigh, NC (US); Jeffrey David Witwer, Clayton, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/893,056

(22) Filed: Jun. 27, 2001

(65) Prior Publication Data

US 2003/0000752 A1 Jan. 2, 2003

(51) Int. Cl.$^7$ ................................................ B60K 11/00
(52) U.S. Cl. .................... 180/68.1; 180/68.2; 180/68.3; 180/69.2
(58) Field of Search ............................... 180/68.1, 68.2, 180/68.3, 68.4, 69.2, 69.24; 95/273

(56) References Cited

U.S. PATENT DOCUMENTS

| 2,128,957 A | 9/1938 | Morrison |
| 2,655,091 A | 10/1953 | Geiger |
| 2,796,141 A | 6/1957 | Schreiner |

FOREIGN PATENT DOCUMENTS

| DE | 29 34 095 A1 | 7/1982 |
| FR | 2 356 533 | 1/1978 |

OTHER PUBLICATIONS

Toro, Toro Groundsmaster 200 Series, 8 pages, publication date—1990, published in U.S.A.
Toro, Toro Reelmaster 335–D, 4 pages, publication date—1990, published in U.S.A.
Toro, Toro Groundsmaster 300 Series, 10 pages, publication date—1992, published in U.S.A.
Middlesworth Engineering and Manufacturing Inc., Middlesworth Commercial Flail Lawnmower, 2 pages, publication date—unknown, published in U.S.A.
Howard Price Turf Equipment, Turf Blazer 530, 4 pages, publication date—unknown, publication location—unknown.
Howard Price Turf Equipment, Hydro–Power 180, 6 pages, publication date—unknown, publication location—unknown.
Grazer, Grazer Professional Series, 2 pages, publication date—1992, published in U.S.A.
Jacobsen Textron, Jacobsen HM–11 High Production Lightweight Mowing, 4 pages, publication date—unknown, published in U.S.A.
Excel Industries Inc., Hustler Out–fronts, 8 pages, publication date—unknown, published in U.S.A.
Howard Price Turf Equipment, Hydro Power 1280, 6 pages, publication date—unknown, published in U.S.A.
Ransomes Textron, Ransomes 951D, 4 pages, publication date—1999, published in U.S.A.
Jacobsen Textron, Jacobsen HR–5111, 6 pages, publication date—1999, published in U.S.A.
Deere & Company, John Deere 1600 Wide Area Mower, 5 pages, publication date—unknown, published in U.S.A.

*Primary Examiner*—Brian L. Johnson
*Assistant Examiner*—Hau Phan

(57) ABSTRACT

An elongated air intake screen is provided for vehicles such as commercial mowers that operate in conditions having substantial airborne foreign materials that tend to clog the screen. The exterior surface of the screen is provided with intake openings throughout its 360 degree surface to draw air over a substantial area. It is located at the upper edge of the vehicle to separate it from the cutting decks and area where airborne grasses and similar foreign materials are encountered. Air drawn into the screen is used to cool the engine and hydraulic fluid heat exchangers and provide for engine combustion needs.

14 Claims, 5 Drawing Sheets

U.S. PATENT DOCUMENTS

| | | | |
|---|---|---|---|
| 3,524,398 A | 8/1970 | Winfrey | |
| 3,837,149 A | 9/1974 | West et al. | |
| 3,941,034 A | 3/1976 | Helwig et al. | |
| 4,169,501 A | 10/1979 | Takeuchi et al. | |
| 4,287,961 A | 9/1981 | Steiger | |
| 4,341,277 A | 12/1982 | Adamson et al. | 180/54 |
| 4,403,648 A | 9/1983 | Styok | |
| 4,483,412 A | 11/1984 | Couturier | |
| 4,531,574 A | 7/1985 | Hoch | |
| 4,535,862 A | 8/1985 | LeBlanc | |
| 4,542,785 A | 9/1985 | Bagnall et al. | |
| 4,606,422 A * | 8/1986 | Jewett | 180/68.1 |
| 4,700,534 A | 10/1987 | Reilly | 56/13.3 |
| 4,768,423 A | 9/1988 | Boeger | |
| 4,881,957 A * | 11/1989 | Shofner | 95/273 |
| 4,916,902 A | 4/1990 | Pratt et al. | |
| 4,969,533 A | 11/1990 | Holm et al. | |
| 5,122,167 A * | 6/1992 | Daniels | 95/273 |
| 5,284,115 A | 2/1994 | Imanishi et al. | |
| 5,285,751 A | 2/1994 | Liegeois et al. | |
| 5,306,332 A * | 4/1994 | Allen | 95/273 |
| 5,494,006 A | 2/1996 | Davis, Jr. | |
| 5,570,738 A | 11/1996 | Christensen | |
| 5,676,197 A | 10/1997 | Diebold et al. | |
| 5,678,648 A * | 10/1997 | Imanishi et al. | 180/68.1 |
| 5,689,953 A * | 11/1997 | Yamashita et al. | 180/68.1 |
| 5,785,139 A | 7/1998 | Freedy et al. | |
| 5,947,219 A * | 9/1999 | Peter | 180/68.1 |
| 6,024,164 A | 2/2000 | Sorbel | |
| 6,036,444 A | 3/2000 | Barney et al. | |
| 6,058,898 A | 5/2000 | Freese, V | |
| 6,068,675 A | 5/2000 | Tsuda et al. | |
| 6,105,349 A | 8/2000 | Busboom et al. | |
| 6,136,055 A | 10/2000 | Stanck | |
| 6,167,976 B1 | 1/2001 | O'Neill et al. | 180/69.2 |
| 6,200,465 B1 | 3/2001 | Carawan et al. | |

* cited by examiner

FIG. 3
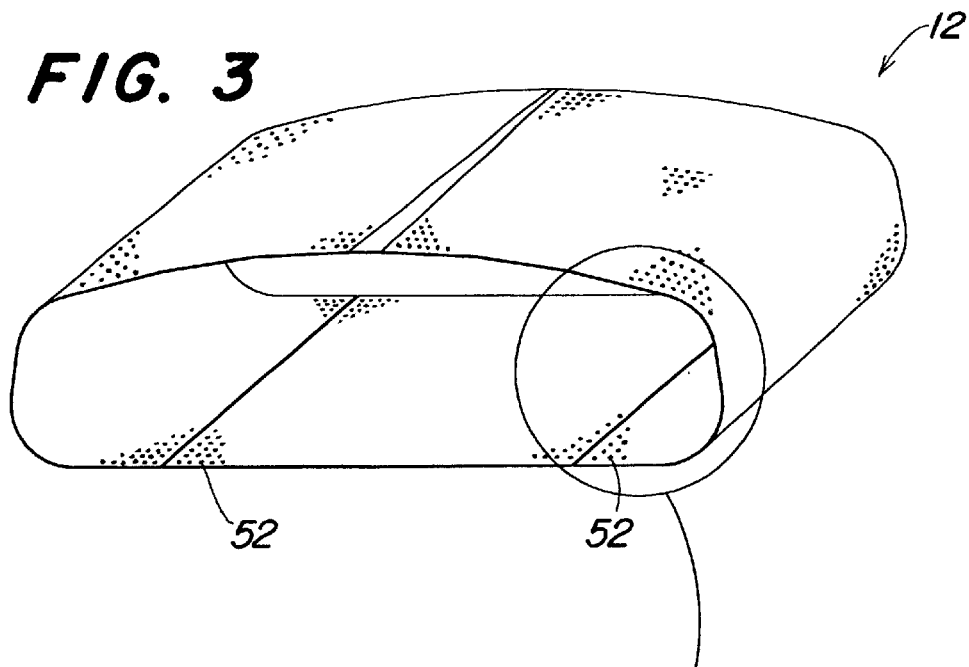
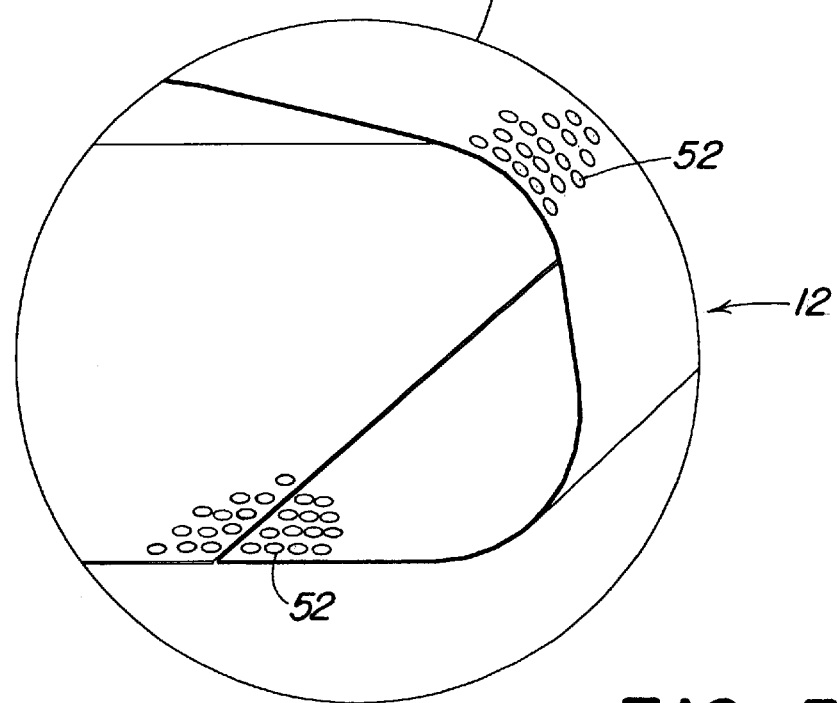
FIG. 3a

US 6,823,955 B2

360 DEGREE AIR INTAKE SCREEN

The entire right, title and interest in and to this application and all subject matter disclosed and/or claimed therein, including any and all divisions continuations, reissues, etc., thereof, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

FIELD OF THE INVENTION

The present invention relates generally to vehicles used to mow grass and similar vegetation and more specifically to an air intake screen used with such vehicles.

BACKGROUND OF THE INVENTION

Vehicles such as commercial mowers are commonly used for extended periods in warm climates. Since these vehicles typically utilize liquid cooled engines, they have fans and radiators for cooling the liquid. Similarly, they generally use hydraulic oil to power lift cylinders and related power needs on the vehicle. This oil is also cooled by passing it through an oil cooler.

As the blades of the implements drawn by the mower cut grass and similar vegetation, the drier cut grass particles and similar foreign materials become airborne. Typically air intake screens are provided in front of the heat exchangers, that is the radiator and oil cooler, to minimize the build up of such foreign materials on the heat exchangers and the consequent effect on the cooling of the water and oil. These intake screens also serve to minimize the amount of foreign material being drawn into the engine combustion system.

It has been common to place air intake screens directly in front of the cooling fan and heat exchangers at the rear of the engine compartment. Generally these screens are oriented vertically. Since the dust and airborne particles are more predominate near the cutting decks and lower portions of the mower, such placement frequently results in the screens becoming filled with foreign material, thereby requiring frequent servicing.

One attempt in reducing the accumulation of material on the screen of a front mount mower was to place the screen at the front of the engine compartment and directly behind the operator seat. While this located the screen further from the dust and swirling airborne materials at the lower portions of the mower, it still used a smaller screen which resulted in frequent cleanings.

Accordingly, it would be desirable to provide an air intake screen for use with a mower that extended the time between required cleanings. Further, it would be desirable to provide an air intake screen that provided sufficient filtered air for the liquid coolant radiator, the oil cooler and the engine combustion system.

It would as well be desirable to provide an air intake screen that reduced engine overheating, hydraulic oil overheating, and lost time for screen cleanings.

SUMMARY OF THE INVENTION

Toward these ends, there is provided a tubular air intake screen that draws air in throughout its 360 degree exterior surface. The screen is placed above the engine compartment to minimize exposure to the dry grass particles and similar foreign materials generated by the mower blades. The screen is sealed at its forward end and open at its rearward end to funnel filtered air to a vertical duct work that leads to a fan and engine air intake duct. The fan moves filtered air over the liquid and oil heat exchangers.

With the present invention, a large volume of filtered air is available and the cleaning cycle for servicing the screen is substantially extended.

BRIEF DESCRIPTION OF THE DRAWINGS

FIG. 3 is an enlarged front view of the air intake screen.

FIG. 3a is a yet further enlarged and partial view illustrating that the screen is provided with openings throughout its full 360 degree tubular surface.

DESCRIPTION OF THE PREFERRED EMBODIMENT

Figure 1:
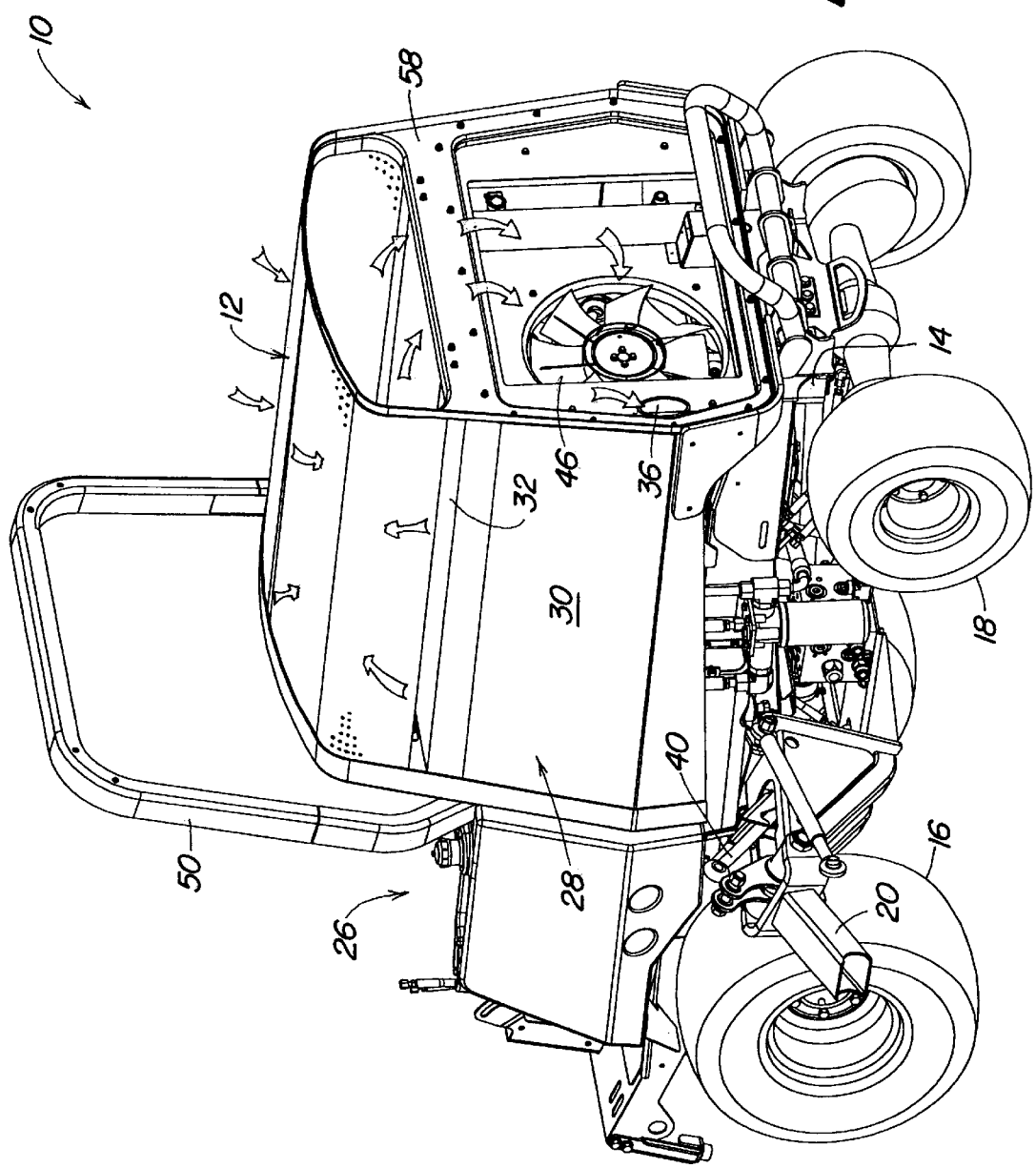
FIG. 1 is a rear elevated perspective view of a front mount mower utilizing the tubular screen subject of the present invention. In this view, the rear duct is removed to expose the cooling fan and engine air intake duct.

Looking first to FIG. 1, there is illustrated a rear elevated perspective view of a front mount mower 10 utilizing the tubular air intake screen 12 subject of the present invention. It will be understood that not all of the operator station elements are shown nor are the side and front cutting deck implements.

Figure 2:
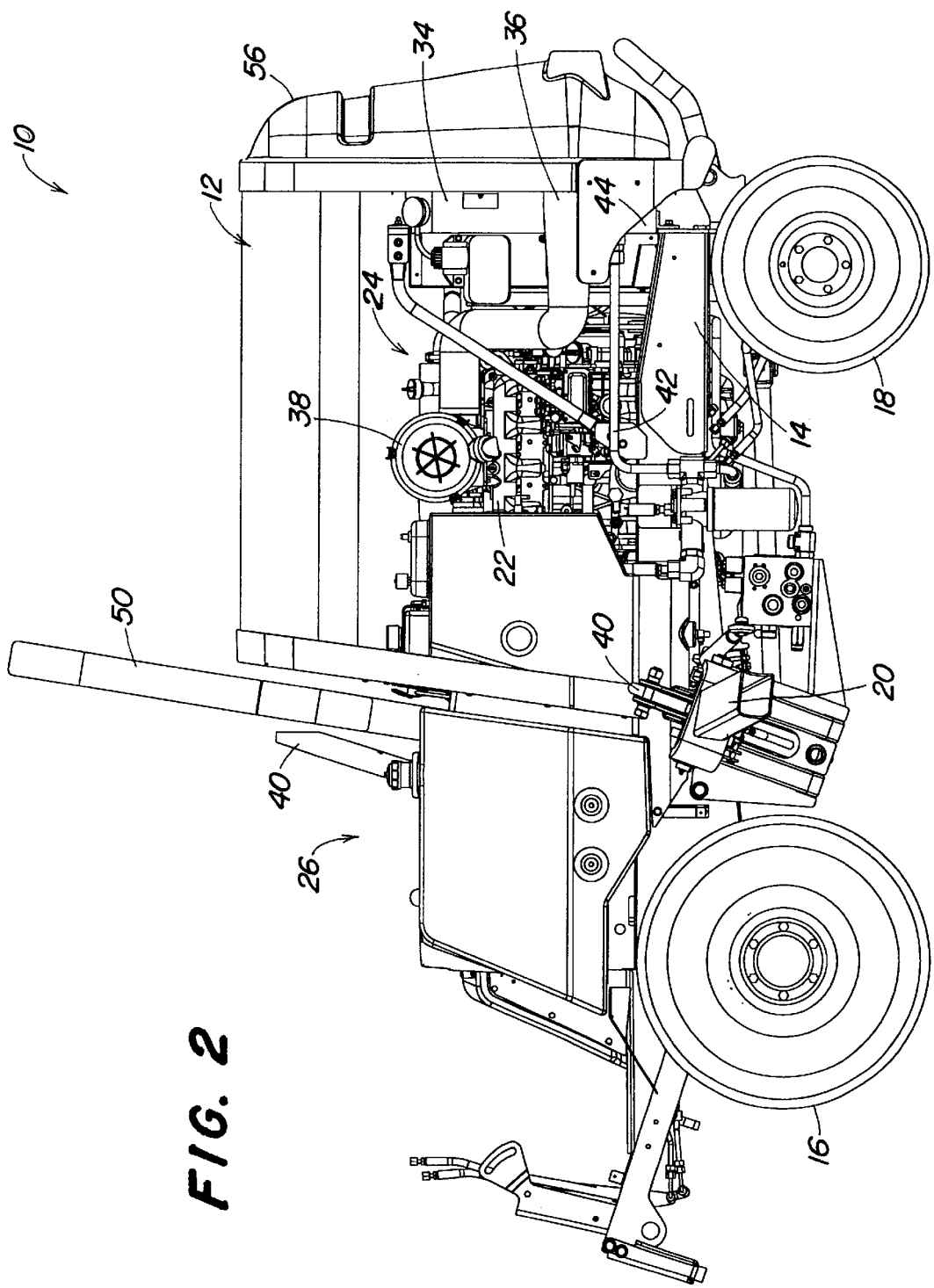
FIG. 2 is a side view of the commercial front mower with the side panels removed to expose the engine compartment. At the rear of the mower is carried the vertical duct that directs air from the screen to the cooling fan and engine air intake duct.

The mower 10 includes a frame 14 supported by front and rear wheels 16 and 18. The frame 14 further supports left and right implement lift structures, only one portion of the left structure 20 being shown. Carried in the rear portion of the frame 14 is an engine 22. Looking as well to FIG. 2, it can be seen that the engine compartment 24 is carried in the mid portion of the frame 14, behind the operator station 26 and enclosed in a hood 28 having sides 30 and a top surface 32. The engine 22 in the preferred embodiment is liquid cooled and is provided with a radiator 34 at the rear portion of the engine compartment 24. The engine 22 is further provided with a combustion air intake duct 36 that leads to an air filter 38 above the engine 22.

The mower 10 is also provided with a hydraulic oil system for powering the mower deck lift cylinders 40 and related other power needs of the mower 10. The mower's hydraulic fluid reservoir is provided with a line 42 that leads to an oil cooler 44 at the rear of the engine compartment 24. These heat exchangers, that is the radiator 34 for the liquid or water and the oil cooler 44 for the hydraulic oil system are vertically stacked in the preferred embodiment. Both heat exchangers 34 and 44 are positioned in front of a cooling fan 46 at the rear of the engine compartment 24.

Figure 5:
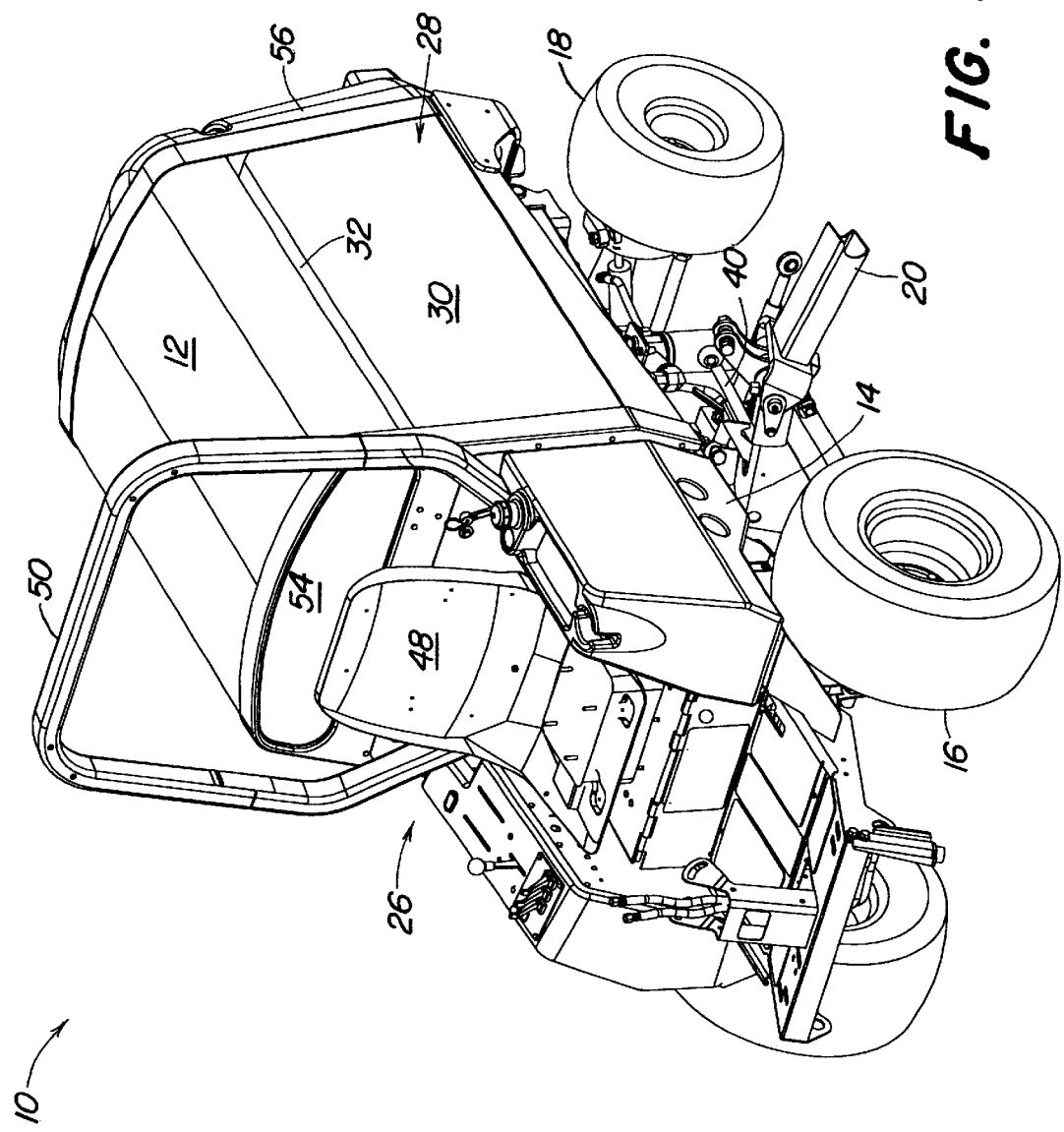
FIG. 5 is a left front elevated perspective view of the mower illustrating the forward and of the screen.

Looking as well to FIG. 5, it can be seen that the forward end of the mower 10 is provided with the operator station 26 including a seat 48 and a rollover protection device (ROPS) 50. Although not shown, the operator station 26 would be equipped with forward and reverse foot controls, brakes, steering wheel, and other related controls.

Looking now to FIG. 3, it will be seen that the tubular air intake screen 12 is generally elliptical in configuration and fore and aft elongated. In the preferred embodiment, the screen 12 is constructed of perforated steel and includes air inlet openings 52 over its full 360 degree exterior surface. At the forward end of the screen 12, there is a cover 54 blocking the entry of air. The rear end of the screen 12 is open and in communication with a bezel or vertical duct work 56 that is removably attached to the rear of the vehicle 10. Looking back to FIG. 2, it can be seen that when the duct work structure 56 is attached to the rear of the vehicle 10, it encloses the cooling fan 46 and the engine combustion air intake duct 36. An airtight seal is provided between the ductwork structure 56 and the frame structure 58 of the vehicle 10.

Figure 4:
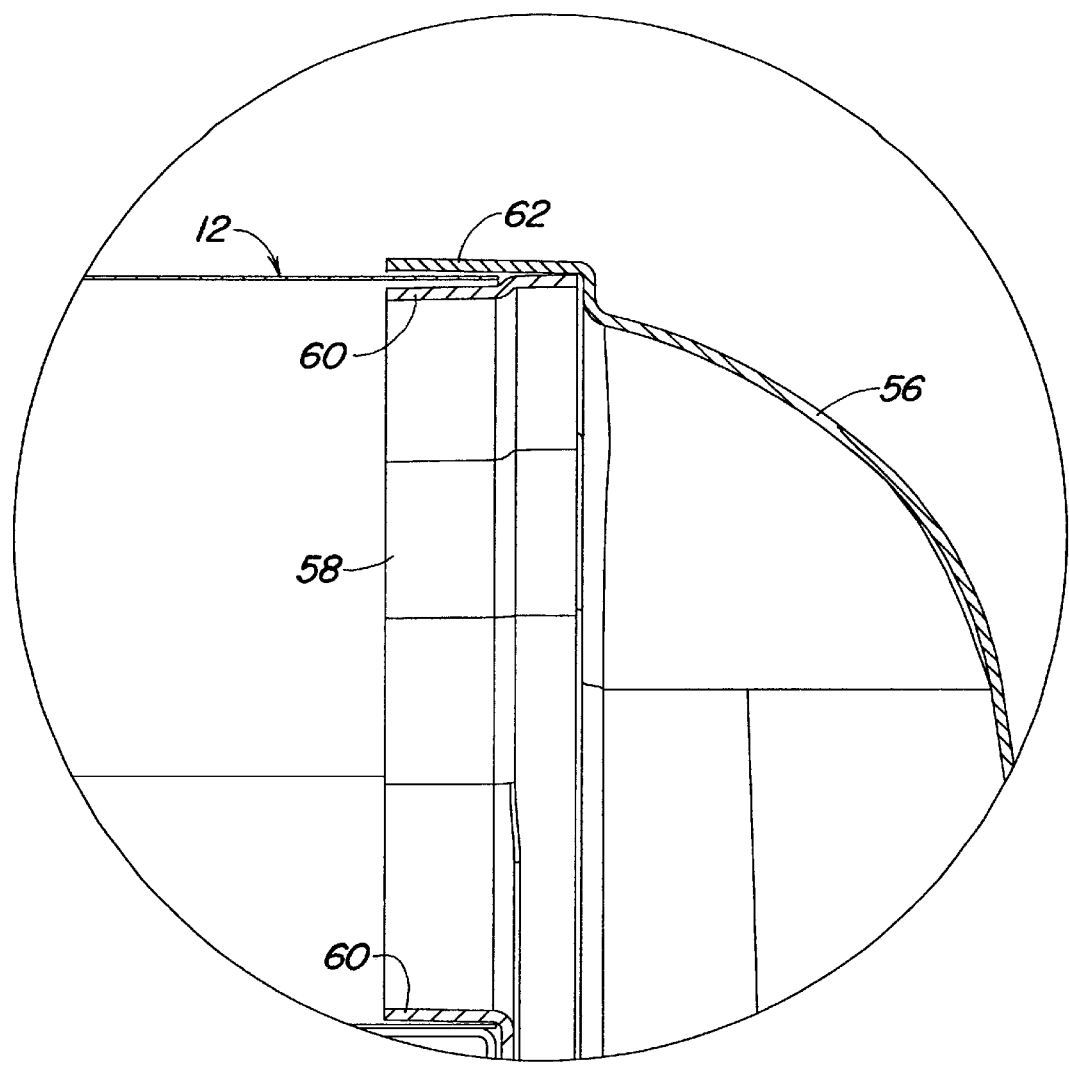
FIG. 4 is an enlarged schematic partial view of the sealing interface between the rear duct and screen.

The screen 12 is sealingly received, as is best illustrated in FIG. 4, between an inside flange 60 of the framework 58 carried at the rear of the vehicle 10 and an outer lip 62 of the duct 56 when it has been attached. A similar inner and outer flange arrangement is provided to secure the forward end of the screen 12 where the cover 54 is provided to prevent intake of unfiltered air.

In operation, the front mount mower 10 is utilized to carry left and right as well as forward decks for cutting grass and similar vegetation. As the mower 10 is used, the cutting blades will lift and cut the grass. In doing so, the blades generate a substantial air movement which causes dryer grass clippings and foreign material to swirl around the decks and lower portion of the vehicle 10. Because the air intake screen 12 is located at the upper portion of the vehicle 10, less of the clippings and foreign material will be drawn into the screen 12.

The screen 12, which is spaced above and apart from the engine compartment 24, will draw air into its duct like interior channel from all around its 360 degree exterior surface. With such a large intake surface area and with the screen 12 located well above the decks, there will be less of a tendency for the screen 12 to become clogged.

As the cooling fan 46 rotates, it draws air through the screen 12, rearwardly through the tubular structure of the screen 12 and then downwardly within the vertical duct work 56. The cooling fan 46 is located rearwardly of the vertically stacked oil and liquid heat exchangers 34 and 44. In the preferred embodiment, the radiator 34 for the water is on the top and the oil cooler 44 for the hydraulic oil is positioned there beneath.

Since the air intake screen 12 draws air throughout its 360 degree exterior tubular surface, the likelihood of foreign material filling its openings 52 and clogging it during daily operation is reduced. The elevated location of the screen 12 further serves to reduce its exposure to the airborne foreign matter as well. When the operator needs to clean the screen 12, he simply uses an air hose to blow foreign material particles from the openings 52.

The hood or engine cover 30 swings open to allow access to the cooling fan 46, heat exchangers 34 and 44 and the interior portion of the screen 12. For further access to the interior portion of the screen 12, the duct work 56 can be removed.

With the present invention, there is provided an air intake screen 12 with a substantial surface area that permits substantial volumes of air to be provided to the cooling fan 46 to cool the heat exchangers 34 and 44 and provide clean air to the engine 22. With the elevated location of the screen 12, it is removed from much of the airborne foreign material and thereby reduces the rate at which the material accumulates within the openings 52 of the screen 12. Accordingly, overheating of the engine 22 and/or hydraulic system is minimized and time between servicing requirements for cleaning the screen 12 is substantially extended.

Having described the preferred embodiment, it will become apparent that various modifications can be made without departing from the scope of the invention as defined in the accompanying claims.

We claim:

1. An improved air intake structure for use with a vehicle having
    a frame supported by first and second wheels;
    an engine carried by the frame;
    a cooling fan operatively associated with the engine for cooling it;
    duct structure having first and second end portions, the first end portion being coupled with the fan;
    said intake structure being carried adjacent to the engine and including
        a tubular screen having first and second end portions with the second end portion being coupled with the second end portion of the duct structure, the screen being adapted to form an exterior surface of the vehicle.

2. The invention of claim 1 wherein the vehicle includes a liquid cooled engine, an element for cooling the liquid coupled with the engine, and the cooling fan is coupled with the element.

3. The invention of claim 2 wherein the screen includes a tubular portion having a foraminous external surface that extends 360 degrees around the tubular portion.

4. The invention of claim 1 wherein the first end portion of the screen is blocked.

5. The invention of claim 1 wherein the tubular portion is generally rectangularly shaped.

6. The invention of claim 1 wherein the screen includes a tubular portion having a foraminous external surface that extends 360 degrees around the tubular portion.

7. The invention of claim 6 wherein the tubular portion extends generally fore and aft and is spaced above the engine.

8. The invention of claim 6 wherein the tubular portion is generally rectangularly shaped.

9. The invention of claim 6 wherein the first end portion of the screen is blocked.

10. An air intake screen useable with a vehicle having
    a frame supported on front and rear wheels;
    means for supporting the screen on the frame;
    a liquid cooled engine carried by the frame with a liquid cooling element attached thereto;
    a cooling fan operatively coupled with the element for directing air to it;
    a duct structure having first and second end portions, the first end portion being in communication with the fan;
    said screen having a generally elongated tubular configuration with first and second ends, said first end being closed and said second end being in communication with the second end portion of the duct structure, the screen being adapted to form an exterior surface of the vehicle.

11. The invention of claim 10 wherein the screen includes a tubular portion having a foraminous external surface that extends 360 degrees around the tubular portion.

12. The invention of claim 11 wherein the tubular portion extends generally fore and aft and is spaced above the engine.

13. The invention of claim 11 wherein the tubular portion is generally rectangularly shaped.

14. The invention defined in claim 13 wherein the tubular portion has a generally flat lower edge.

* * * * *